(12) United States Patent
Highley

(10) Patent No.: US 8,977,054 B2
(45) Date of Patent: *Mar. 10, 2015

(54) CANDIDATE IDENTIFICATION BY IMAGE FINGERPRINTING AND MODEL MATCHING

(71) Applicant: DST Technologies, Inc., Kansas City, MO (US)

(72) Inventor: Joshua O. Highley, Kearney, MO (US)

(73) Assignee: DST Technologies, Inc., Kansas City, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/452,701

(22) Filed: Aug. 6, 2014

(65) Prior Publication Data

US 2014/0355890 A1    Dec. 4, 2014

Related U.S. Application Data

(63) Continuation of application No. 13/220,387, filed on Aug. 29, 2011, now Pat. No. 8,831,350.

(51) Int. Cl.
| | |
|---|---|
| *G06K 9/00* | (2006.01) |
| *G06K 9/32* | (2006.01) |
| *G06K 9/62* | (2006.01) |
| *G06K 9/72* | (2006.01) |

(52) U.S. Cl.
CPC ........ *G06K 9/00483* (2013.01); *G06K 9/00449* (2013.01); *G06K 9/00463* (2013.01); *G06K 9/00859* (2013.01); *G06K 9/3208* (2013.01); *G06K 9/6206* (2013.01); *G06K 9/72* (2013.01)
USPC .......................................... 382/177; 382/224

(58) Field of Classification Search
None
See application file for complete search history.

(56) References Cited

U.S. PATENT DOCUMENTS

| | | | |
|---|---|---|---|
| 5,054,098 | A | 10/1991 | Lee |
| 5,159,667 | A | 10/1992 | Borrey et al. |
| 5,321,770 | A | 6/1994 | Huttenlocher et al. |
| 5,434,933 | A | 7/1995 | Karnin et al. |
| 5,438,630 | A | 8/1995 | Chen et al. |
| 5,825,919 | A | 10/1998 | Bloomberg et al. |
| 5,850,476 | A | 12/1998 | Chen et al. |
| 5,867,597 | A | 2/1999 | Peairs et al. |
| 6,442,555 | B1 | 8/2002 | Shmueli et al. |
| 7,475,061 | B2 | 1/2009 | Bargeron et al. |
| 7,561,734 | B1 | 7/2009 | Wnek |
| 7,711,192 | B1 | 5/2010 | Smirnov |
| 7,793,824 | B2 | 9/2010 | Lapstun et al. |
| 8,478,761 | B2 | 7/2013 | Moraleda |
| 2009/0018990 | A1 | 1/2009 | Moraleda |

*Primary Examiner* — Barry Drennan
(74) *Attorney, Agent, or Firm* — Lempia Summerfield Katz LLC

(57) ABSTRACT

Candidate identification utilizing fingerprint identification is disclosed. The method includes receiving a candidate image comprising a plurality of constituent elements arranged in a content pattern, compensating for rotation variation in the content pattern of the received candidate, analyzing each of the plurality of constituent elements comprising the content pattern of the received candidate image to define a bounded area about each of the plurality of constituent elements, building a candidate fingerprint representative of the content pattern wherein the candidate fingerprint is based on the defined bounded area, comparing the candidate fingerprint to a plurality of fingerprints wherein each of the plurality of fingerprints represents one of a plurality of exemplars, identifying one of the plurality of fingerprints that corresponds to the candidate fingerprint, and evaluating the candidate and one or more identified exemplars to determine the best match there between, wherein the identified exemplar corresponds to the one of the plurality of fingerprints.

35 Claims, 9 Drawing Sheets

COMPONENT BOUNDING RECTANGLES

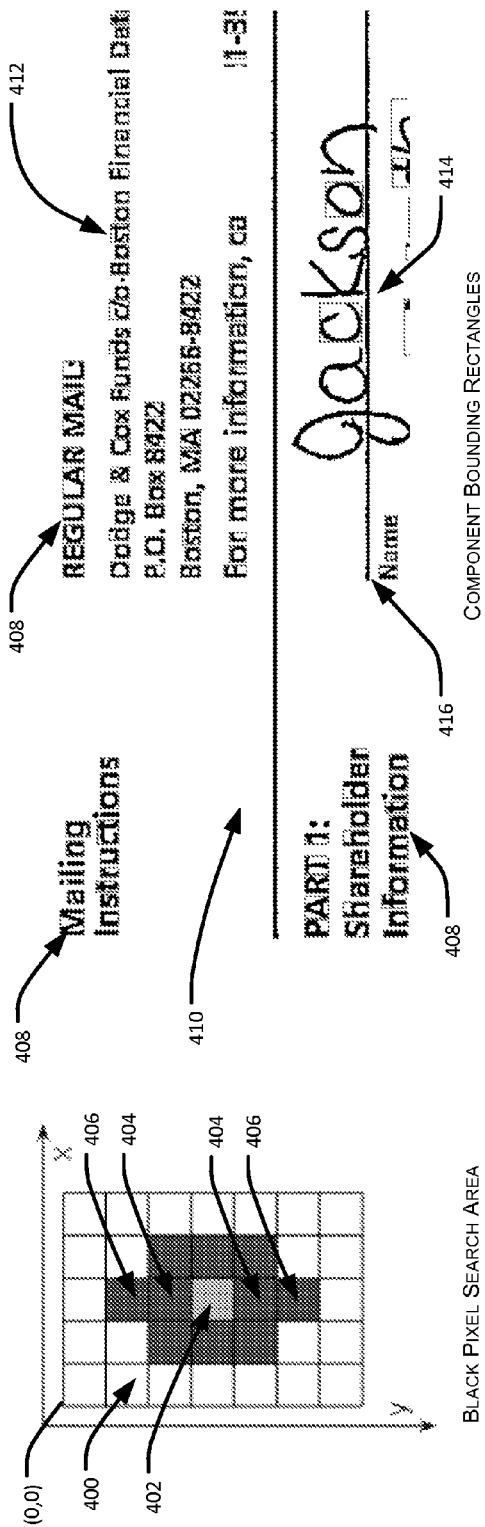
FIG. 4A — BLACK PIXEL SEARCH AREA
FIG. 4B — COMPONENT BOUNDING RECTANGLES
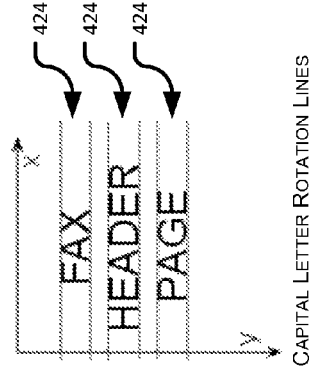
FIG. 4E — CAPITAL LETTER ROTATION LINES
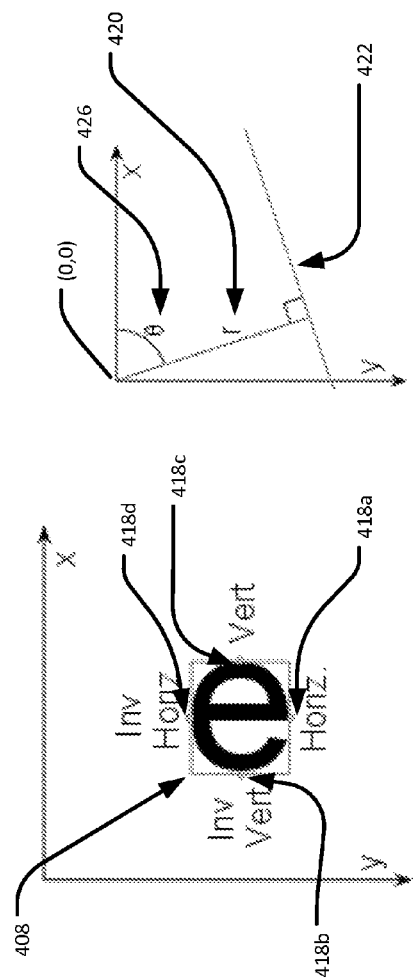
FIG. 4D — R-THETA LINE REPRESENTATION
FIG. 4C — HOUGH TRANSFORM POINTS

CANDIDATE IDENTIFICATION BY IMAGE FINGERPRINTING AND MODEL MATCHING

REFERENCE TO RELATED APPLICATIONS

This application is a continuation under 37 C.F.R. §1.53(b) of U.S. patent application Ser. No. 13/220,387 filed Aug. 29, 2011 now U.S. Pat. No. 8,831,350, the entire disclosure of which is hereby incorporated by reference.

TECHNICAL FIELD

The present disclosure relates generally to a system and method for candidate identification, and more particularly to a system and method for candidate identification that generates a candidate pattern based on a processed candidate and compares it to a known pattern generated from an exemplar.

BACKGROUND

Document receiving organizations often receive vast quantities of printed forms from users, such as magazine subscription forms, change of address forms, and generally forms utilized to provide or submit customer or client information. A received form may be thought of to include two distinct types of information: (1) underlying typographic information of the form itself, and (2) any hand or typewritten information provided or added to the form by a user. The document receiving organization scans the received form and generates an electronic image containing both types of information. The generated electronic images may, in turn, be utilized to facilitate the processing of the original received forms. Since the document receiving organization may receive a variety of different forms and form types, in different variations, each of which may require different or customized processing, the processing of the forms may be expedited if the type of each form can be automatically identified, such as by comparing the generated electronic image of each form to electronic images of blank forms, or form templates. However, while the received forms may include all or part of a blank form, the received forms may also include one or more variations to the blank form, such as information added to forms by users, facsimile markings, coffee stains, ink smudges, etc. The variations may result in noise which renders image comparison techniques based on pixel and location checking ineffective, thereby requiring the receiving organization to manually identify and/or classify each received form.

SUMMARY

The present disclosure discusses and explains a method and algorithm for candidate identification and fingerprinting of, for example, an electronic document image. The disclosed algorithm generally relates to steps and procedures for receiving and classifying a digital image of an unknown document. Specifically, the disclosed algorithm and/or algorithms process the received image to identify patterns therein. Each point in the pattern represents one or more connected characters or marks on the form. The patterns serve to emphasize the underlying typographical information of the form itself while minimizing the impact or effect of the additional hand or typewritten information provided by the user. The pattern is then corrected for rotation and upon completion of the correction, the pattern may be compared to stored patterns generated based on underlying typographic information of the form.

In an embodiment, a method of candidate identification utilizing fingerprint identification is disclosed. The method includes receiving a candidate comprising content arranged in a content pattern, wherein the received candidate corresponds to one of a plurality of exemplars, compensating for any rotational variation identified in the content pattern of the received candidate, analyzing each of a plurality of constituent elements comprising the content pattern of the received candidate to build a fingerprint representative of the content pattern, comparing the fingerprint to a plurality of fingerprints, wherein each of the plurality of fingerprints corresponding to one of the plurality of exemplars, evaluating the candidate and one or more identified exemplars to determine the best match there between, wherein the identified exemplar corresponds to the one of the plurality of fingerprints.

In another exemplary embodiment, a method of candidate identification utilizing fingerprint identification is disclosed. The method includes receiving a candidate image comprising a plurality of constituent elements arranged in a content pattern, compensating for a rotational variation in the content pattern of the received candidate, analyzing each of the plurality of constituent elements comprising the content pattern of the received candidate image to define a bounded area about each of the plurality of constituent elements, building a candidate fingerprint representative of the content pattern wherein the candidate fingerprint is based on the defined bounded area, comparing the candidate fingerprint to a plurality of fingerprints wherein each of the plurality of fingerprints represents one of a plurality of exemplars, identifying one of the plurality of fingerprints that corresponds to the candidate fingerprint, and presenting the candidate and an exemplar that corresponds to the identified one of the plurality of fingerprints to a user for evaluation thereof.

In yet another embodiment, a method of identifying a candidate based on candidate content arranged in a content pattern, wherein the candidate corresponds to one of a plurality of exemplars is disclosed. The method includes correcting for rotational variation in a candidate by analyzing each of a plurality of constituent elements of the content pattern, generating a fingerprint representative of the content pattern, comparing the generated fingerprint to a plurality of fingerprints arranged such that each fingerprint corresponds to one of the plurality of exemplars, and presenting the candidate and an identified exemplar to a user for evaluation thereof, wherein the identified exemplar corresponds to the one of the plurality of fingerprints.

Other embodiments are disclosed, and each of the embodiments can be used alone, or in one or more combinations. Additional features and advantages of the disclosed embodiments are described in, and will be apparent from, the following Detailed Description and the figures.

BRIEF DESCRIPTION OF THE FIGURES

FIGS. 4A to 4E are images depicting the illustrates steps or processes shown in FIG. 3;

DETAILED DESCRIPTION

The disclosed method and system for performing this method are directed to the image correction and compensation of a received candidate document, the generation of a substantially unique identification or fingerprint for the received candidate document and the identification of this generated fingerprint among a plurality of stored fingerprints representing multiple exemplar forms, documents or other information structures. For example, the disclosed method of candidate fingerprinting and model matching process provides a means by which an image of a form can be identified by a comparison to a list or database of known fingerprints and models. If a fingerprint and/or model is identified, the disclosed method and system returns the fingerprint and identification information associated with an exemplar form.

The disclosed method and system for performing this method includes three main steps: (1) a candidate image is processed, analyzed and any rotational correction is applied; (2) the results of the rotational corrected and processed candidate image are then the subject of a pixel-level evaluation to build or otherwise generate a fingerprint that corresponds to the candidate image, and (3) the generated fingerprint is then compared to a list or database of fingerprints that represent exemplar forms. Each step or portion is, in this exemplary embodiment, compounded or built on the result from the previous step or element. In this way, the fingerprint or result from the second step or portion in the disclosed method is comprised of a list of rotation-corrected elements that was generated in the first step or portion. Subsequently, the fingerprint is utilized to identify a matching model that comprises a fingerprint in addition to any other identification information.

The model may be generated based on a fingerprint built from a clean, high quality image (i.e., an image having low or little distortion and noise) of a known form or page of a form if it is a multipage document. If the fingerprint corresponding to the candidate image is determined to match one of the fingerprints of the exemplar forms, then the remaining model information can be used to map specific model points to corresponding points in the candidate image (and vice-versa). In this way, the mappings of the model may be adjusted to the specific image based on its rotation, translation, and scale as will be discussed and disclosed in more depth herein. The disclosed method and system may further enable, but may not perform, additional functionality such as document splitting and work classification.

Figure 1:
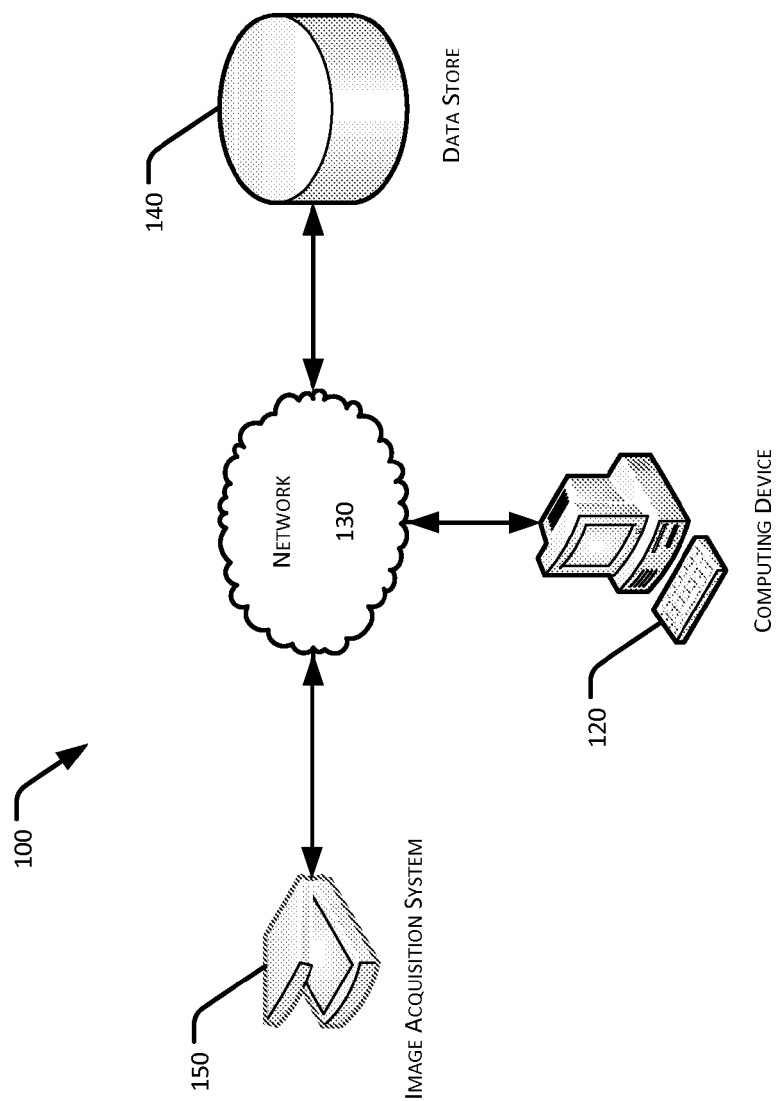
FIG. 1 is a general overview of a system for candidate identification that determines or identifies a candidate pattern generated from a processed candidate.

FIG. 1 provides a general overview of a system 100 for candidate identification. Not all of the depicted components may be required, however, and some implementations may include additional components. Variations in the arrangement and type of the components may be made without departing from the spirit or scope of the claims as set forth herein. Additional, different or fewer components may be provided to increase or alter the capabilities of the system 100.

The system 100 may include a computing device 120, a network 130, a data store 140, and an image acquisition device 150. The computing device 120, in this embodiment, displays and provides an operator interface for use by an operator. The image acquisition device 150 may be used to create one or more candidate or electronic document images from one or more paper documents containing typographic information corresponding to a form and handwritten information provided by a form filer. Alternatively, or in addition to, the image acquisition device 150 may receive candidate or candidate images from other sources or terminals connected through the network 130. For example, the image acquisition device 150 may be a facsimile machine configured to receive image information from the computing device 120 or another facsimile machine via telephone network or other network 130.

The typographic information of each candidate, candidate image or electronic document image corresponds to typographic information of forms of varying document types that are received by the system 100. The typographic information may be information printed, or applied, to the medium by a machine, such as an inkjet or laser printer. The typographic information may be identified by one or more characteristics, such as typeface, color, point size, line length, leading space, tracking space and kerning space. The typographic information may indicate where handwritten or other user supplied information, or indicia thereof, should be applied to the medium using lines, boxes or other indicators that provide visual cues to where handwritten information should be provided. The handwritten information may be applied to the medium using a writing implement, such as a pen, pencil, stylus, marker, crayon or other writing instruments. The writing implement, in another embodiment, may be a handheld device for applying information on a medium that can create a smooth, controllable line. In other embodiments, the user supplied information may be provided using a typewriter, a laser printer or other mechanical or electromechanical means.

The image acquisition device 150 may be a device capable of converting information contained on the medium into an electronic document image or otherwise receiving electronic document images from another source, such as from a storage device or via a wired or wireless network. For example, the image acquisition device 150 may be a scanner or other digital image capture device. The image acquisition device 150 communicates with the computing device 120 and the data store 140 through the network 130. Alternatively, or in addition to, the image acquisition device 150 may be in direct communication with one or more of the computing device 120 or the data store 140 utilizing a wired connection such as a universal serial bus (USB) connection, a serial connection or other known or later developed connection scheme or protocol. In yet another embodiment, the image acquisition device 150 may be combined with or include elements of the computing device 120 or the data store 140. For example, the image acquisition device 150 may be a handheld device with a camera that can capture an image of a document, such a smartphone or tablet including a camera or generally any handheld device capable of generating an electronic document image from a physical document. The image acquisition device 150 may introduce variations in the candidate image, such image skew, image noise, or any other visual artifacts.

In an embodiment, an operator or user monitors the progress of the system 100 via an operator interface (not shown) configured to facilitate the review of the electronic document images generated by the image acquisition device 150. If the system 100 is unable to identify a document type corresponding to a received electronic document image, the operator may interact with the operator interface to manually identify the document type corresponding to the received electronic document image.

The data store 140 may be operative to store data relating to the candidate, candidate images and/or electronic document information such as transformations of the electronic document images, the typographic information, the document type characterizing an electronic document image, or any other data related to the system 100. The other data related to the system 100 may include information describing known exemplars, such as electronic document images depicting blank forms used by the organization. For example, the data store 140 may store a set of models and patterns describing each exemplar. Models may include a fingerprint for a given exemplar and a mapping between model points and image points which allows for modification or adjustment of the electronic document image based on a determined rotation, translation and scale.

The data store 140 represents one or more relational databases or other data stores managed using various known database management techniques, such as, for example, SQL and object-based techniques. The data store 140 implements using one or more magnetic, optical, solid state or tape drives, or other storage mediums available now or later developed.

In this embodiment the data store 140 is shown in communication with the computing device 120 via the network 130. In this configuration, the data store 140 implements as a database server running MICROSOFT SQL SERVER®, ORACLE®, IBM DB2® or any other database software. The data store 140 may further be in communication with other computing devices and servers through the network 130.

The network 130 may include wide area networks (WAN), such as the Internet, local area networks (LAN), campus area networks, metropolitan area networks, or any other networks that may facilitate data communication. The network 130 may be divided into sub-networks that allow access to all of the other components connected to the network 130 in the system 100. Alternatively, the sub-networks may restrict access between the components connected to the network 130. The network 130 may be configured as a public or private network connection and may include, for example, a virtual private network or an encryption scheme that may be employed over the public Internet.

The computing device 120 may be connected to the network 130 in any configuration that supports data transfer. These configurations include both wired and wireless data connections to the network 130. The computing device 120 can further run a web application on any platform that supports web content, such as a web browser or a computer, a mobile phone, personal digital assistant (PDA), and/or any appliance or device capable of data communications.

The computing device 120 may be a machine that has a processor, memory, a display, a user interface and a communication interface, such as the computing device described in FIG. 2 below. The processor may be operatively coupled with the memory, display and the interfaces and to perform tasks at the request of the standalone application or the underlying operating system. Herein, the phrases "coupled with" and "connected to" are defined to mean directly connected to or indirectly connected through one or more intermediate components. Such intermediate components may include both hardware and software based components.

The memory represents any hardware configuration capable of storing data. The display operatively couples to the memory and the processor in order to display information to the operator. The user interface, in turn, is stored in the memory and executed by the processor for display via the display. The user interface provides a mechanism by which an operator can interact with the system and matching program and algorithm. From the above descriptions, it is to be inferred that the system and method for candidate identification is highly adaptable and configurable. The flexible nature of the disclosed system and method allow for a wide variety of implementations and uses for the discussed and disclosed technology and algorithms.

Herein, the phrase "operatively coupled" is defined to mean two or more devices configured to share resources or information either directly or indirectly through one or more intermediate components. The communication interface may be operatively coupled with the memory, and the processor, and may be capable of communicating through the network 130 with the image acquisition device 150. The standalone application may be programmed in any programming language that supports communication protocols. Examples of these languages include: SUN JAVA®, C++, C#, ASP, SUN JAVASCRIPT®, asynchronous SUN JAVASCRIPT®, or ADOBE FLASH ACTIONSCRIPT®, amongst others.

The computing device 120 may be any mobile device that has a data connection and may run a mobile application. The data connection may be a cellular connection, a wireless data connection, an internet connection, an infra red connection, a Bluetooth connection, or any other connection capable of transmitting data. For example, the mobile application may be an application running on an iPhone™ available from Apple, Inc.

Figure 2:
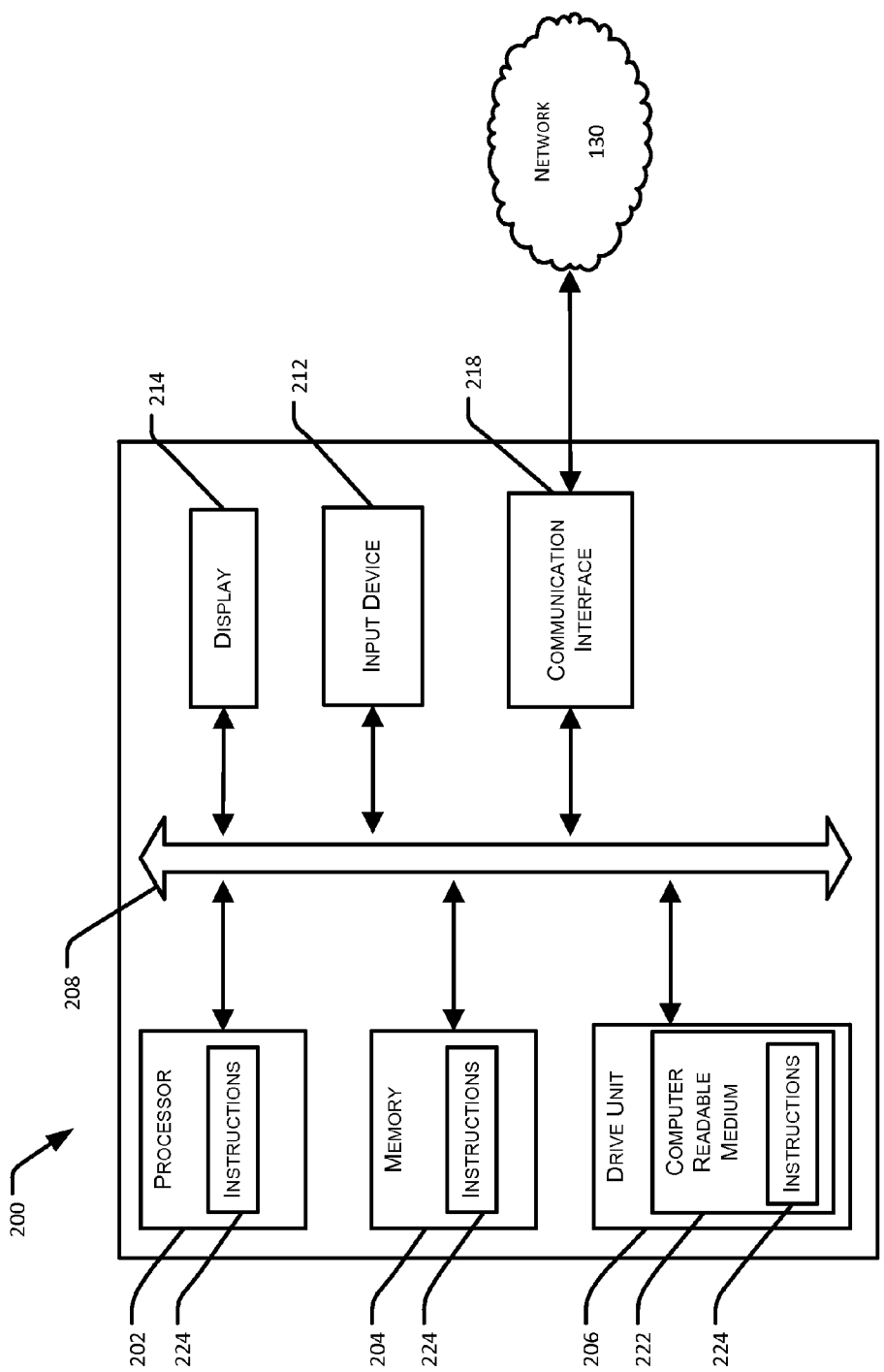
FIG. 2 illustrates a general computer system that may be used in the system of FIG. 1, or other systems for candidate identification.

FIG. 2 illustrates a general computer system 200 such as the computing device 120, or any of the other computing devices referenced herein. The computer system 200 stores and executes an algorithm or a set of instructions 224 to cause the performance of any one or more of the methods or computer based functions discussed and disclosed in this patent document. The computer system 200 may operate as a standalone device or may be connected to other computer systems or peripheral devices.

In a networked deployment, the computer system 200 may operate in the capacity of either a server or a client computer in a server-client network environment, or as a peer computer system in a peer-to-peer (or distributed) network environment. The computer system 200 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 224 (sequential or otherwise) that specify actions to be taken by that machine. In a particular embodiment, the computer system 200 may be implemented using electronic devices that provide voice, video or data communication. Further, while a single computer system 200 may be illustrated, the term "system" shall also be taken to include any collection of systems or sub-systems that individually or jointly execute a set, or multiple sets, of instructions to perform one or more computer functions via the network 130.

As illustrated in FIG. 2, the computer system 200 includes a processor 202, such as, a central processing unit (CPU), a graphics processing unit (GPU), or both. The processor 202 may be a component in a variety of systems. For example, the processor 202 may be part of a standard personal computer or a workstation. The processor hardware may incorporate one or more general processors, digital signal processors, application specific integrated circuits, field programmable gate arrays, servers, networks, digital circuits, analog circuits, combinations thereof, or other now known or later developed devices for analyzing and processing data.

The computer system 200 may include a memory 204 that can communicate via a bus 208. The memory 204 can be divided or segmented into, for example, a main memory, a static memory, and a dynamic memory. The memory 204 includes, but may not be limited to, computer readable storage media and various types of volatile and non-volatile storage media such as: random access memory; read-only memory; programmable read-only memory; electrically programmable read-only memory; electrically erasable read-only memory; flash memory; magnetic tape or disk; optical media and the like. In one case, the memory 204 includes a cache or random access memory for the processor 202. Alternatively, or in addition to, the memory 204 may be separate from the processor 202, such as the system memory.

The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is configured to store instructions 224 executable by the processor 202. The functions, acts or tasks illustrated in the figures or described herein may be performed by the programmed processor 202 executing the instructions 224 stored in the memory 204. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 200 may further include a display 214, such as a liquid crystal display (LCD), an organic light emitting diode (OLED), a flat panel display, a solid state display, a cathode ray tube (CRT), a projector, a printer or other now known or later developed display device for outputting determined information. The display 214 acts as an interface for the user to see the functioning of the processor 202, or specifically as an interface with the software stored in the memory 204 or in the drive unit 206.

The computer system 200 further includes an input device 212 configured to allow a user to interact with any of the components of system 200. The input device 212 may be a number pad, a keyboard, or a cursor control device, such as a mouse, or a joystick, touch screen display, remote control or any other device operative to interact with the system 200.

The computer system 200, in other embodiments, includes a disk or optical drive unit 206 to accessibly interpret computer-readable medium 222 on which one or more algorithms or set of instructions 224, e.g. software, is embedded. The algorithms or instructions 224 perform one or more of the methods or logic as described herein. The algorithms 224 may reside completely, or at least partially, within the memory 204 and/or within the processor 202 during execution by the computer system 200. The memory 204 and the processor 202 also may include other forms or configurations of computer-readable media as discussed above.

The present disclosure contemplates a computer-readable medium 222 that includes instructions 224 or receives and executes instructions 224 responsive to a propagated signal; so that a device connected to a network 130 may communicate voice, video, audio, images or any other data over the network 130. Further, the instructions 224 may be transmitted or received over the network 130 via a communication interface 218. The communication interface 218 may be implemented in software or may be a physical connection in hardware. The communication interface 218 provides a connection with the network 130, external media, the display 214, or any other components in system 200 or combinations thereof. In one embodiment, the connection with the network 130 is a physical connection such as a wired Ethernet connection or may be established wirelessly such as via a cellular telephone network, an 802.11, 802.16, 802.20, or WiMax network. The network 130 in other embodiments can be a public network, such as the Internet, a private network, such as an intranet, or combinations thereof, and may utilize a variety of networking protocols now available or later developed including, but not limited to TCP/IP based networking protocols.

The computer-readable medium 222 may be a single medium or may comprise multiple mediums such as a centralized or distributed database and/or associated caches and servers that store one or more sets of instructions. The term "computer-readable medium" is generally utilized to describe any medium that may be capable of storing, encoding or carrying an algorithm or set of instructions for execution by a processor or that may cause a computer system to perform any one or more of the methods or operations disclosed herein.

The computer-readable medium 222 may include a solid-state memory such as a memory card or other package that houses one or more non-volatile read-only memories. The computer-readable medium 222 further includes or encompasses random access memory or other volatile re-writable memory. Additionally, the computer-readable medium 222 may include a magneto-optical or optical medium, such as a disk or tapes or other storage device to capture carrier wave signals such as a signal communicated over a transmission medium. A digital file attached to an e-mail or other self-contained information archive or set of archives may be considered a distribution medium that may be a tangible storage medium. The present disclosure may be considered to include any one or more of a computer-readable medium or a distribution medium and other equivalents and successor media, in which data or instructions may be stored.

In other embodiments, dedicated hardware implementations, such as application specific integrated circuits, programmable logic arrays and other hardware devices, may be constructed to implement one or more of the methods described herein. Applications that include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

I. Candidate Processing and Rotational Correction

The computer system 200 discussed herein is configured to implement an exemplary candidate image processing and classification algorithm encoded and represented by the instructions 224 and executable by the processor 202. The encoded instructions and algorithm begins by processing and analyzing a candidate image to correct any rotational aberration. The result of the correction process is a corrected candidate image. This corrected candidate image is then subjected to a pixel-level evaluation to build and generate a fingerprint that identifies the candidate image and the form upon which it is based. The generated fingerprint is then compared to a collection of fingerprints each representing any number of exemplary forms. The exemplary forms, in these embodiments, are forms that include only the underlying typographical information of the form itself without any user provided hand or typewritten information. In other exemplary embodiments, the forms could include both the underlying typographical information and information or marks provided by the user. These marked up forms may be processed to minimize the extraneous information or may, due to time and processing constraints, be used in an unprocessed format. The exemplary candidate image processing and classification algorithm then matches the candidate fingerprint with one of the collection of fingerprints and, in turn, the exemplary form to which it corresponds. If a match is identified, the candidate image may be automatically classified or may be presented to a user for manual classification or confirmation of the automatic classification.

A. Pixel Identification

The exemplary candidate image processing and classification algorithm initiates a rotational correction process or algorithm 300. The algorithm 300, in turn, begins with the receipt of a candidate image from the image acquisition device 150 (302). The received candidate image is subjected to a pixel-by-pixel image processing routine (304). In particular, the analysis is a bounded Hough Transform that limits the processing of the received candidate image to a range of +/−3 degrees of rotation for each orientation of text: horizontal, vertical, inverted horizontal, and inverted vertical. The result or output of the Hough Transform, as will be discussed in detail below, is a processed candidate image corrected to a zero (0) degree rotation relative to the horizontal test orientation. By utilizing a bounded Hough Transform, computation resources can be managed to ensure performance of the algorithm. It will be understood that as computation resources are increased, or as the transform process is refined, the breadth or range of the analysis may be correspondingly increased.

The algorithm 300 continues the pixel-by-pixel of analysis of the received candidate image until a black pixel is identified (306). For example, the pixel-by-pixel analysis of the 5.times.7 pixel portion of the received candidate image shown in FIG. 4A begins in the top left corner of the image designated the origin (0,0). The pixel analysis begins a scan of the candidate image and checks each pixel proceeding from left to right and top to bottom. Upon identification of the black pixel, the pixel location (e.g., x, y coordinate) is stored in the memory 204 (308). To avoid re-detection, the pixel (310) color or value is set from black to white (e.g., from zero (0) to one (1)).

The algorithm 300 upon detection of a black pixel, initiates a neighbor analysis (312) centered on the stored x, y coordinates of the detected pixel. The neighbor analysis, as the name implies, evaluates pixels near or neighboring the stored x, y coordinates of the detected black pixel (314). For example, the "neighborhood" of the detected black pixel can be defined as the 8 pixels immediately adjacent to the initial stored x, y coordinate. The neighbor analysis sub-process (312) loops until there are no more black pixels detected at any of these locations around the initial stored x, y coordinate (316). Upon detection of each black pixel, the location (e.g., x, y coordinate) of the pixel is stored in the memory 204 (318). All black pixels that are considered neighbors of the current pixel are saved to the memory 204 and set to white to avoid re-evaluation (320). The algorithm 300 iteratively executes the neighbor analysis (312) until each pixel within a neighborhood of one of the detected black pixel has been evaluated (322). In this way, groups of connected or adjacent black pixels can be detected and stored.

When no more black pixels are detected in the neighborhood of any other black pixel, the minimum x, maximum x, minimum y, and maximum y values stored in the memory 204 are utilized to define a bounding rectangle (324). The boundary rectangle represents a perimeter encompassing the detected collection of adjacent black pixels that comprise a component such as a letter, line or other information on the form. Upon completion of the neighbor analysis (312) the boundary rectangle information is stored to the memory 204 as an output (326). The scan for black pixels then resumes (returns to step 306) where it left off before entering the neighbor analysis sub-process (312), except that each of the detected black pixels has now been set to white and so will not be re-processed as the algorithm 300 continues. The algorithm 300 continues to loop and process each black pixel detected within the candidate image until the end of the image information had been detected (328).

A pixel's 'neighbor' is determined by parameters that define how close (in terms of pixels) two black pixels must be in order to be considered connected. For example, as discussed above the neighbors or neighborhood may consist of the 8 pixels immediately adjacent to detected black pixel. Alternatively and as a shown in FIG. 4A, the neighborhood 400 may be defined as having an x distance of one (1) pixel and a y distance of two (2) pixels. Stated another way, the neighborhood of the initial stored x, y coordinate includes the eight (8) pixels immediately surrounding the starting pixel 402. The neighborhood 400 can further include the two pixels 404, 406 directly above or directly below the starting pixel. In this instance, the intervening pixel 404 can be either a white (1) or black (0) black pixel. In this way, pixels that are immediately diagonal of the starting pixel are also connected and identified as neighbors. The pixels beyond the immediate diagonals are not considered connected or neighbors regardless of the x and y distance values. The particular x and y values of the neighborhood 400 can be adjusted to achieve a desired scan accuracy, speed and result.

B. Rotational Analysis

FIG. 4B shows an example of a portion of a candidate image after a plurality of boundary rectangles 408 representing the identified collections of connected black pixels have been defined. After the algorithm 300 identifies each boundary rectangle 408; the properties, e.g., the width, height, aspect ratio, and area, of the rectangle are evaluated and stored in the memory 204. In this illustrated portion of the candidate image, it should be noted that fax and scanner noise 410 results in one or more adjacent characters being linked together into a single component. For example, the 's' is connected to the 't' in 'Boston' by the scanner noise 410 such that the boundary rectangle encompasses connected black pixels forming the letters "st" (see reference identifier 412). Similarly, when handwriting crosses a horizontal line (see the proper name "Jackson" 414 shown in FIG. 4B), the line 416 connects multiple handwriting characters and the resulting boundary rectangle is filtered out and ignored by the algorithm 300 based on its large size.

Periods and some fax/scanner noise 410 can, in some embodiments and configurations, be filtered out and ignored due to their small size which may be determined in terms of the number of identified or connected black pixels. Dashes ("-") and certain characters such as the letter "i" may further be filtered out and/or ignored by the algorithm 300 based on their aspect ratio (i.e., they are either a purely vertical or purely horizontal character) or narrow dimension (i.e., they are only one or two pixels wide). These filtering techniques typically do not result in weighting or fingerprint errors because the number of correctly defined boundary rectangles 408 tend to overwhelm the noise 410 and filtered information.

In some instances, it should be noted that the noise 410 still provides valid data as evidenced in the preceding example involving the word "Boston" shown in FIG. 4B. In this example, the identified boundary rectangle 412 for the component "st" includes the same baseline as the individual "s" and "t" components. Thus, further processing provides the same or similar results with or without the noise 410.

At this point in the algorithm 300, a list of boundary rectangles 408 has been identified and stored in the memory 204 for further processing, these boundary rectangles 408 may be utilized to derive representative points for each that can, in turn, be utilized and analyzed by the Hough Transform. In particular and as shown in FIG. 4C, a mid-point 418a to 418d of the bottom side of the boundary rectangle 408 is derived and stored for each orientation of each of the listed boundary rectangles 408 (330). The stored mid-points 418a to 418d can now be utilized by the bounded Hough Transform to correct for rotation that may have been present in the original candidate image. The "bottom" side of the boundary rectangle 408 changes depending on the orientation being evaluated: horizontal uses the bottom side mid-point 418a, inverse horizontal uses the top side mid-point 418d, vertical uses the right side mid-point 418c, and inverse vertical uses the left side mid-point 418b (332).

The algorithm 300 continues by executing or looping the Hough Transform twice (see 344) for each of the four (4) orientations. The first iteration evaluates possible rotation values in zero point two (0.2) degree increments from negative three to three (−3 to 3) degrees from the zero (0) or other cardinal direction associated with each orientation. Thus, for the true range of degrees for inverse horizontal (hone-hundred eighty (180) degree) orientation relative to the original (zero (0) degree orientation); the horizontal candidate image orientation range is defined as one hundred seventy seven (177) degrees to one-hundred eighty-three (183) degrees. The second iteration repeats the process at zero point zero one (0.01) degree increments across a one (1) degree range centered on the result and rough estimate generated the first iteration (334). This second iteration serves to fine tune or otherwise refine the coarse or rough estimate generated by the first iteration. In some embodiments, implementation of the first iteration (i.e., the coarse estimate) may be conditional there being enough points 418 to ensure accurate results and/or performance. For example, if fewer than fifty (50) points 418 exist for evaluation, the accuracy and results may be impaired. In order to minimize the potential inaccuracy, a minimum threshold of, for example, a thousand (1000) points may be required in order to initiate the first iteration. If the minimum number of points is not present, the algorithm 300 may simply skip to the second iteration (see 342).

As shown in FIG. 4D, the algorithm 300 continues to implement the Hough Transform to determine the overall rotation present in the points derived from the candidate image. Specifically, the algorithm 300 calculates and locates the mid-point 418 (individually identified by the references 418a to 418d) of each side of each boundary rectangle 408 relative to the origin (0,0) of the candidate image. The polar coordinates r and θ for each mid-point 418 at each orientation are then determined and identified for further evaluation (336). In the present example, the parameter r represents a vector 420 from the origin (0, 0) and θ is the angle 426 of the vector 420 with respect to the x-axis, respectively (see FIG. 4D). It will be understood that θ could be determined relative to either the x or y-axis. For example, since θ is the angle from the x-axis, each of the angles θ are adjusted 90 degrees to ensure that horizontal text in a horizontally-oriented image will have a rotation of zero (0) degrees. Thus, the angle θ can be adjusted in increments of ninety (90) based on the orientation of the candidate image being evaluated. The vertical orientation requires no adjustment.

The algorithm 300 and the Hough Transform continue to execute and populate a two-dimensional accumulator array (338). Specifically, the algorithm 300 allocates or constructs the array within the memory 204 to store the r and θ parameters associated with the determined mid-points 418. Thus, the dimensions of the array are the values of the parameters r and θ. The r dimension is a distance (defined by the vector 420) defined as the maximum of the determined width or height (max [width, height]) of the candidate image. The θ dimension is the number of steps between negative three (−3) and three (3) degrees at zero point zero one (0.01) degree increments. In other words, the θ dimension of the array, in this embodiment, equals 601. In an embodiment, an additional buffer may be built into or added to each dimension of the array to ensure it is of sufficient size.

The line 422 is, in turn, constructed based on the stored or accumulated r and θ points. Specifically, the line 422 is generated based on the coordinates r and θ (theta) for each mid-point 418 along a single orientation. For each set of coordinates stored in the memory, r is solved for each possible value of θ over the range discussed above (340). The formula for determining r states that:

$$r = x^* \cos(\theta) + y^* \sin(\theta)$$

The algorithm 300 subsequently utilizes the x, y values of each mid-point 418, at each orientation, to calculate a value for r that corresponds to each of the values of θ determined in the first iteration, i.e., the rough estimate of rotation. The algorithm repeats this process for the second iteration based on the identified results of the first iteration, assuming that the points being evaluated satisfied the minimum threshold for implementation of the first iteration (342). In particular, for each of the x, y values that defines the mid-point 418, a number of line 422 are plotted going through it at angles defined by the values of θ (the range of which is discussed above). A vector 420 is defined as extending perpendicularly from each of the number of lines 422 to the origin (0, 0). The length r of the vector 420 (i.e., the perpendicular distance to the origin (0,0)) and the angle θ of each vector 420 are then determined for each line 422 and orientation plotted. The number of occurrences of any coordinate pair (r, θ) is stored in the accumulator array. The algorithm repeats this process for each of the x, y values and calculates a value for r over the range of θ values.

After processing all of the points for a given orientation, the algorithm 300 identifies the paired values of r and θ determined to have occurred the most frequently, i.e., received the most occurrences or votes. The algorithm 300 repeats until each of the four orientations has been evaluated in this manner (344).

In some embodiments, the effects of fax header lines and graphics can be compensated for in order to adjust the algorithm's 300 accuracy and precision (346). For example, the top five (5) vote counts for each θ can be summed, and the θ value with the highest total is then used as the rotation for the orientation being evaluated. In turn, after all four orientations are evaluated, the orientation with the highest vote count determined to be most likely orientation and the corresponding value of θ identified as the rotational variance. In order to minimize outliers and inaccuracies, the highest vote count could be based on a sum of top five (5) identified pairs. The original received candidate image is then rotated so that the text is horizontal with a zero (0) degree rotation.

One scenario that can cause an issue for the exemplary rotation detection technique performed by the algorithm 300 is a candidate image containing capitalized letters and words 424. Since both the top and bottom of capital letters lie on a line, an orientation and its inverse can have very similar voting results. In the FIG. 4E, the capitalized letters are shown to bounded by lines determined in the horizontal orientation and in the inverse horizontal orientation. Both sets of lines would likely have the same number of points on them. Given that most candidate images are initially provided in a horizontal orientation, a constant or threshold may be defined in order to help insure an image is really provided in the inverse horizontal orientation before overriding the normal horizontal orientation. In practice, the threshold may require that the inverse horizontal orientation receive ten (10) more points or votes in order to override the "normal" or "typical" horizontal orientation. Fortunately, form pages that are important to business processes very rarely have all capital letters.

II. Candidate Fingerprint Generation and Matching

A. Fingerprint Generation

Figure 3:
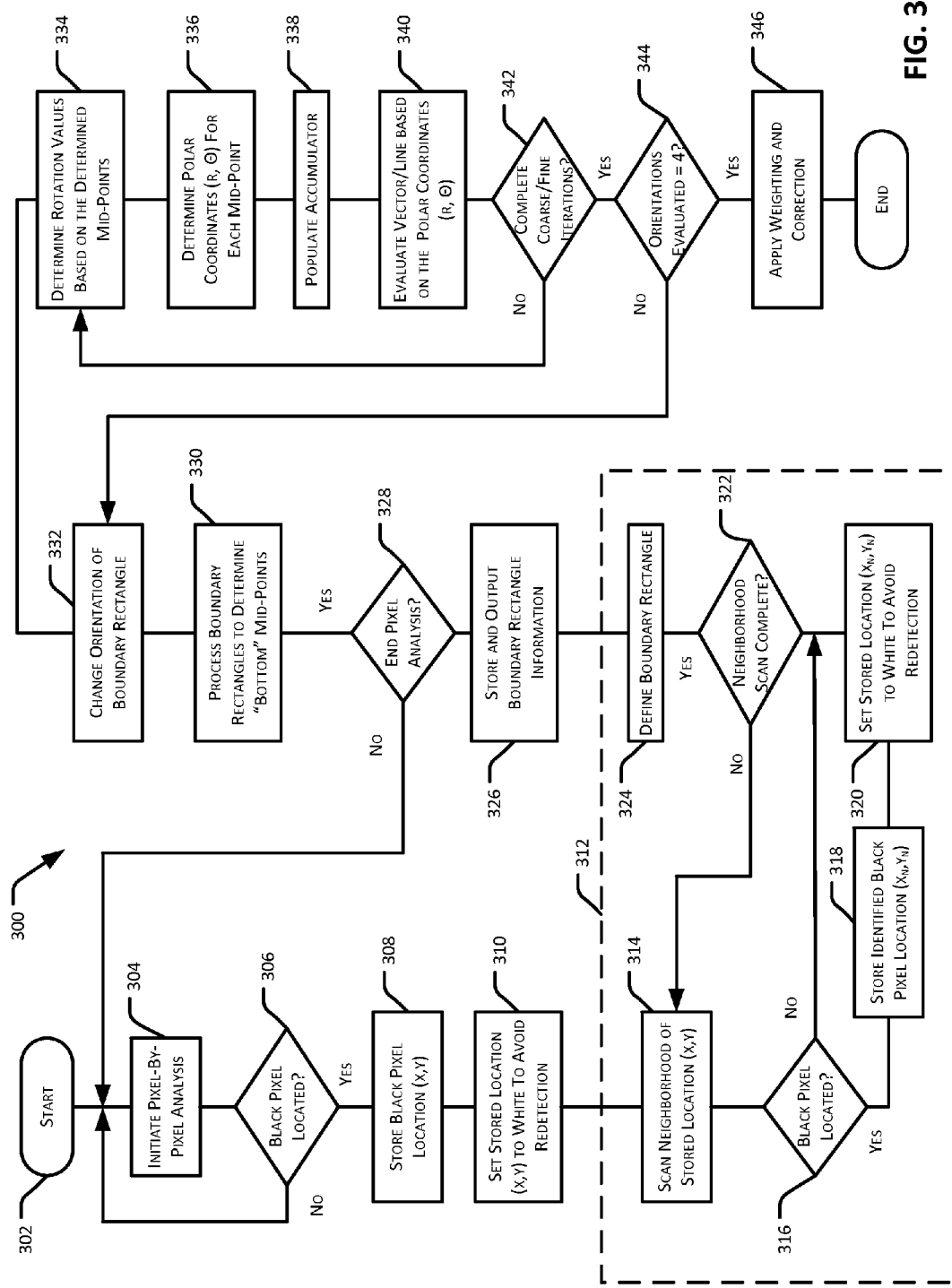
FIG. 3 is a flowchart illustrating the steps or processes implemented to correct for rotational variation in a candidate image.
Figure 5:
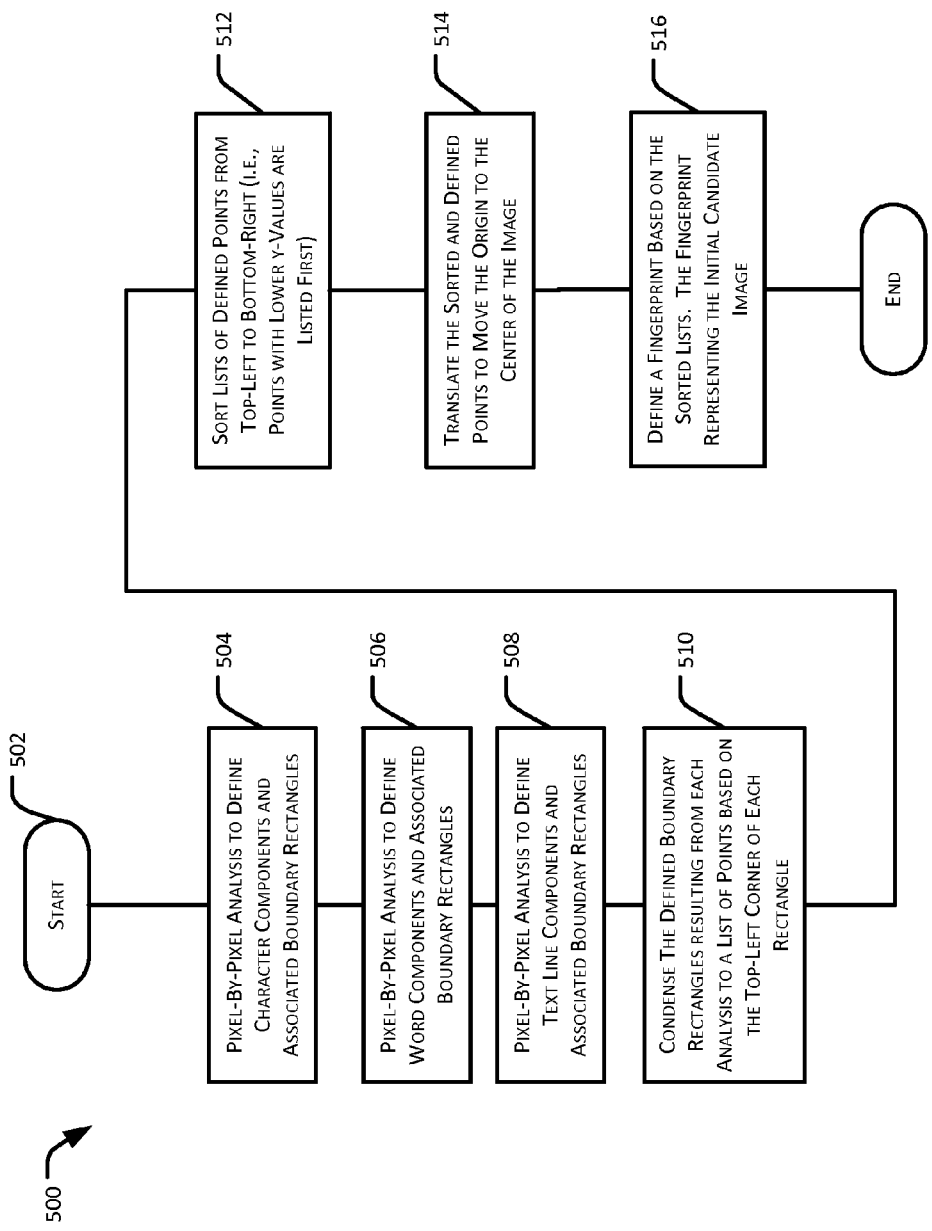
FIG. 5 is a flowchart illustrating the steps or processes implemented to initiate a fingerprint generation algorithm.

At this point in the process, the exemplary candidate image processing and classification algorithm initiates a fingerprint generation process or algorithm 500. The algorithm 500 begins to build a fingerprint for the rotationally-corrected candidate image (502) generated by the algorithm 300. The algorithm 500 executes three (3) independent pixel-by-pixel analyses and iterations to identify different types of components and define boundary rectangles 408 for each of the identified components. The algorithm 500 utilizes a similar pixel-by-pixel analysis and process as discussed above in connection with FIG. 3 and algorithm 300. The components, at this point in the process, represent character components (or rough equivalents of characters), word components and text line components. Each iteration utilizes different parameters to define the "neighborhood" around each pixel.

For example, the first iteration searches for and identifies character or character-like components by defining the neighborhood 400 as having an x distance of one (1) pixel and a y distance of two (2) pixels (504). As previously discussed, and shown in FIG. 4B, boundary rectangles 408 are defined for each of the character and character-like components identified in this first iteration. The second iteration searches for and identifies word and word-like components by defining the neighborhood 400 as having an x distance of six (6) pixels and a y distance of two (2) pixels (506). The increased x distance allows for the narrow white spacing between adjacent characters that make up a word, but is small enough to filter out the larger white space between two adjacent words. In this way, boundary rectangles 408 encompassing whole words can be defined and stored in the memory 204. The third and final iteration searches for and identifies text line and text line-like components by defining the neighborhood 400 as having an x distance of twenty (20) pixels and a y distance of two (2) pixels (508). A neighborhood 400 defined with such an increased x distance, ensures that adjacent pixels across the white space between word components are identified as neighbors and encompassed by the defined boundary rectangle 408. The results of the three iterations are three lists of boundary rectangles representing the components of interest. Each of these lists can, in turn, be stored and accessible via the memory 204.

After the three lists of coordinates describing the boundary rectangles 408 are defined and stored in the memory 204, the algorithm 500 processes each list to identify a single point representative of each stored rectangle (510). For example, the list of boundary rectangles 408 that encompass word and word-like components can be condensed or reduced to a list of points that identify the top-left corner of each of the defined rectangles. In this way, the lists of boundary rectangles 408 can be condensed for each character and character-like component, word and word-like component and text line and text line-like component. By using a single corner points to represent each of the boundary rectangles 408, the processing requirements can be minimized as these values are known (i.e., they were used to define the boundary rectangle 408) and do not require further computations to define. Points representing text line components will be stored with a width component representative of the length of the line of text.

The three identified and processed lists of points are then each sorted in ascending order of y-values such that points with lower y-values will be placed higher in the list (512). For example, the points can be sorted for the top-left corner of the candidate image to the bottom-right corner of the candidate image. If two points are determined to have the same y-value, then the point with the lower x-value will be placed higher on the sorted list. The results of the sorted list may then be translated by the algorithm 500 to shift the origin (0, 0) from the upper left corner of the image to center of the image. In this way, each of the stored x, y coordinates may be shifted to equal a new translated coordinate at location −(width/2), −(height/2). This translation serves to minimize the overall scaling distortion experience by both the exemplar and the candidate fingerprint by reducing and normalizing the maximum distance of any given x, y coordinate from the origin. This normalized distance, in turn, reduces the overall distortion (and size) of the resulting search as will be discussed in connection with FIG. 9A. The reduced size of the search area further serves to improve the run-time performance and accuracy of the overall process.

The resulting three sorted lists, in turn, constitute an image fingerprint or pattern representative of the initial candidate image (516). The initial candidate image is no longer necessary for the operation of the exemplary candidate image processing and classification algorithm. Moreover, the resulting image fingerprint or pattern contains none of the private and sensitive user information (e.g., social security number, tax identification numbers, medical history information and the like) and there is no way to reverse construct or otherwise obtain this information based on the image fingerprint. Accordingly, this image fingerprint can be freely communicated and distributed via both secure and unsecure networks 130 without fear of inadvertently causing a privacy breach.

B. Fingerprint-Exemplar Matching

Upon generation of a fingerprint representing the candidate image, the exemplary candidate image processing and classification algorithm initiates a fingerprint-exemplar matching process or algorithm 600. The algorithm 600 compares the generated fingerprint (i.e., the three (3) sorted lists of points representing character components, word components, and text line components, respectively) with one or more stored models or exemplars of typographical information contained within the forms stored within the memory 204. The models or exemplars represent a fingerprint based on the typographical information of a blank form and further include other identifying information such as a form name, an identification number, a page number or other identification information. In other instances, the model or exemplar may be based on the information gathered from a form that contains user provided information and data.

The models or exemplars utilized by the algorithm 600 are typically generated offline or separately from the correction and fingerprint generation algorithms 300 and 500. However, the generation and creation of exemplar fingerprints will typically be accomplished in a manner similar to the one discussed and disclosed herein. For example, the exemplar image may be a high-quality or high-resolution digital document format or image (e.g., jpeg or PDF) of a blank form. Alternatively, the exemplar image may be based on scan of a form that contains user information, marks or other data.

In order to identify a form corresponding to the candidate image, a pattern matching procedure that compares the individual points of the fingerprint representing the candidate image to the points of a fingerprint representing the exemplar is utilized. As will be understood, the greater the number of points matched between two fingerprints the better the quality of the overall match. The quality of the match can be expressed as a score ranged between 0 and 1000. For example a score of 1000 indicates a 100% match between the two fingerprints while a score of 700 represent a 70% match. Moreover, the stored lengths of the text line and text line-like components can be compared to the lengths of the text line components contained within the exemplar(s). If, for example, the length of the text line components is determined to be within twenty percent (20%) of the length of the length of the exemplar's text line components, then the two may be considered to be matched.

The algorithm 600 represents one embodiment of the pattern matching procedure that may be utilized in connection with the system and method disclosed herein. Initially, the algorithm 600 loads the fingerprint (i.e., the three sorted lists of components) to be matched from the memory 204 (602) and determines if this is the first time the matching process has been implemented for a given fingerprint or if this is the continuation of a loop (604).

If the algorithm 600 is continuing a loop, then memory 204, and more particularly a queue defined within the memory 204, stores and contains a match quality score determined from a previous iteration of the matching algorithm 600. If a previous match quality score is stored, the algorithm 600 loads this previous match quality score and sets the minimum thresholds to equal the values of this previous score (606). The algorithm 600 then evaluates the number of points, for example, either the character points or word points depending on the basis for the stored match quality score, in the fingerprint to be matched against what is needed for the current model or exemplar to receive a better match quality score (608). If it is determined to be mathematically impossible for the current model or exemplar to receive a better match quality score, then the algorithm 600 ends the processing of the current exemplar and proceeds, if one exists, to the next model stored in the memory 204 (proceed to 642). For example, the algorithm 600 may retrieve a stored exemplar having a match score of 800 when compared against a fingerprint having 2000 character points. If the current exemplar to be evaluated by the algorithm 600 contains 2600 character points, then more than 2080 model points (0.80*2600=2080) must be matched in order to achieve a better match score. Given that the fingerprint has only 2000 character points, it is mathematically impossible that a better match score can be determined. Accordingly, the current exemplar can be discarded and the next available exemplar stored in the memory 204 can be evaluated (proceed to 642).

In another scenario, if the current exemplar has 1900 character points, then only 1520 points must be matched to achieve a better match score. In this case, the 2000 character points of the fingerprint contain enough points to potentially generate a better match score with the current exemplar being evaluated by the algorithm 600.

If the algorithm 600 verifies that the exemplar fingerprint could potentially be a better match or if a previous match quality score was not stored in the memory 204, then the evaluation process continues in order to determine if the exemplar fingerprint has enough word points to potentially meet a minimum match quality score (610). In this example, the minimum match quality score is 500 and it represents the score necessary to continue the matching process with the current exemplar. For example, if the current exemplar includes 1800 word points in the sorted list, then the fingerprint being evaluated must have at least 900 word points in order for the process to proceed. If the fingerprint does not include enough points to result in a potential minimum match quality score, then the exemplar is rejected (proceed to 642). It should be noted, that this evaluation occurs regardless of whether or not a previous match score is stored within the memory 204 (see 604).

If the fingerprint can potentially satisfy the minimum match quality score, then the algorithm 600 evaluates the number word points contained within the fingerprint against the number of points that define the current exemplar. If the algorithm 600 determines that the fingerprint contains less than three times as many word points as those available in the exemplar (612), then the exemplar may be rejected and a new exemplar may be loaded from the memory 204 (proceed to 642).

Figure 7:
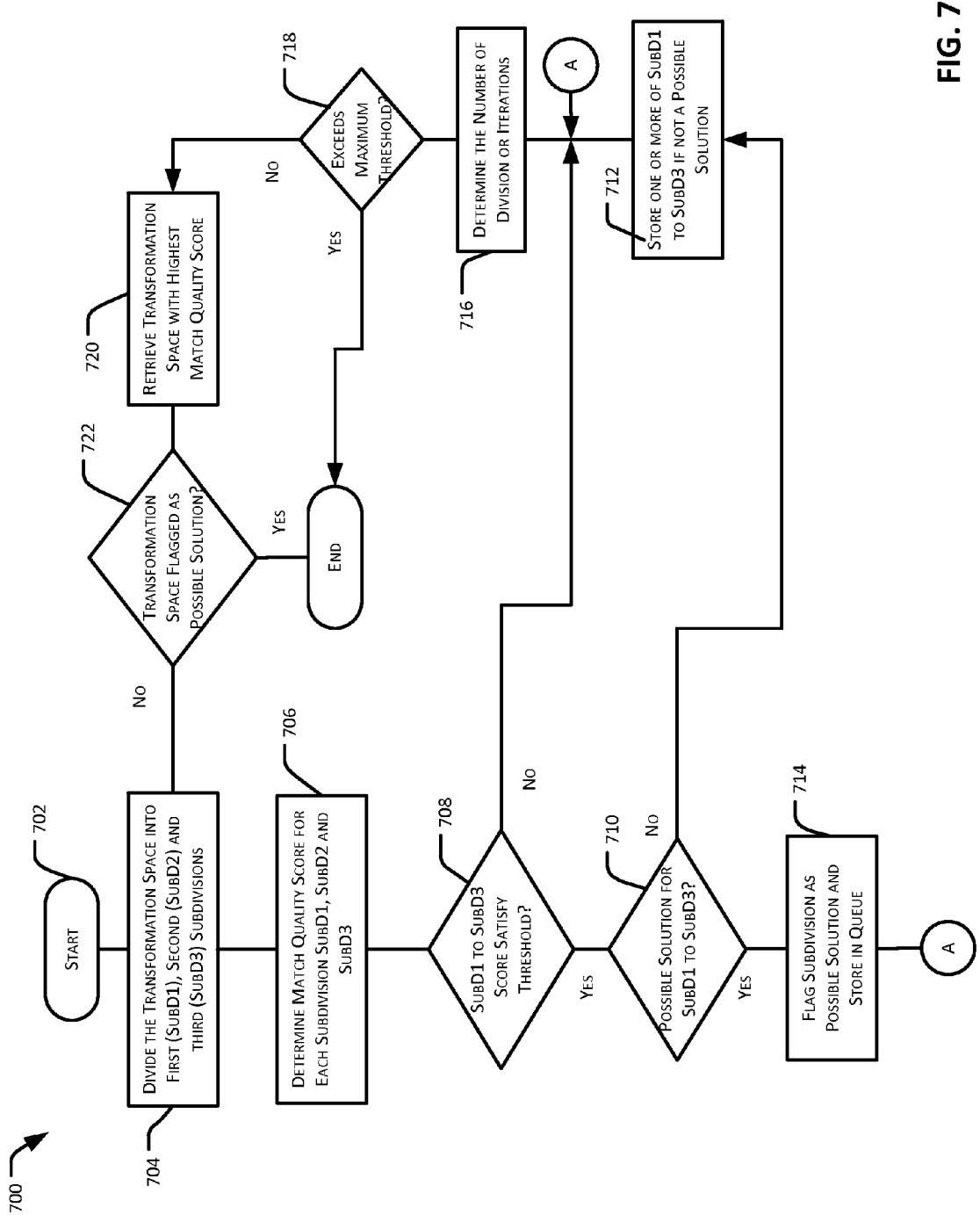
FIG. 7 is a flowchart illustrating the steps or processes implemented to initiate a Recognition by Adaptive Subdivision of Transformation space (RAST) algorithm.

The algorithm 600 next determines if the exemplar includes at least twenty (20) text line components (614). If the exemplar includes at least 20 text line components but the fingerprint being evaluated includes only half the number of text line components (i.e., less than ten (10) text line components), then the exemplar cannot potentially satisfy a minimum match score of 500 (616) and the processing of the current exemplar is discontinued and a new exemplar is loaded from the memory 204 (proceed to 642). If the exemplar being evaluated has less than 20 lines (see 614), then the algorithm 600 skips the RAST algorithm 700 for text line components and proceeds to an implementation of the RAST algorithm 700 tuned for words (622). However, if the algorithm 600 determines a sufficient number of text line components exist within the fingerprint then a performance tuned implementation of a Recognition by Adaptive Subdivision of Transformation space (RAST) algorithm 700 (see FIG. 7) configured to process text line components is implemented (618).

1. RAST Algorithm

The RAST algorithm disclosed herein is discussed in connection with the mapping and verification of the text line components called out as discussed above. However, it will be understood that the principles and concepts discussed and disclosed in connection with this algorithm may be utilized to map and otherwise process points and information for both character and word components.

The RAST algorithm 700 implements and searches for a transformation including rotation, translation and scale that maps enough points from the exemplar to the fingerprint to be considered a match (i.e., a potential solution). Because rotation was previously corrected during the in-processing of the candidate image, translation and scale are the only variables remaining to be detected. Thus, the RAST algorithm 700 is configured to detect and determine x translation, y translation, x and y scale. It should be noted, that while the scales of the candidate images are typically similar, they may not be the same. In order to account for variations between the x scale and the y scale, the RAST algorithm 700 links and restricts the two scales to within +/−3% of each other. For example, if the x scale has a range of between 1.0 to 1.05 (100% to 105%)

then the y scale is checked, and possibly adjusted to be with the range of 0.97 to 1.08 (97% to 108%). If the y scale has already been determined to be within this range (e.g., 0.98 to 1.02) then the scale is not adjusted or modified. However, the x and y translations are determined and evaluated independently. By calculating the translations and scales in this manner, a balance can be achieved between computation efficiency and the overall accuracy of the process.

In operation, the RAST algorithm 700 processes a candidate image such as a normal 200 dpi image on a standard 8.5" by 11" paper. This, in turn results in a candidate image having 1700 pixels by 2200 pixels. The RAST algorithm 700 may utilize an initial transformation space defined as having an x and y translation range of –200 pixels to 200 pixels and a scale range 0.85 to 1.15 (85% to 115%). In this way, the transformation space is defined as having an initial x translation range of –200 to 200, y translation range of –200 to 200 and a scale from 0.85 to 1.15 (702). These translation ranges and scales are relative to the known exemplar because a typical 200 dpi candidate image may include a variation or offset in top and left margins that can shift the image and/or data by up to 1 inch in both the x direction (left to right) and the y direction (top to bottom).

As the RAST algorithm 700 executes, the transformation space is divided into three smaller subdivisions (SubD1, SubD2 and SubD3) which can, for example, be defined as a first subdivision having an x translation range of –200 to 0 and a second subdivision having an x translation range of 1 to 200 and a third subdivision which overlaps or spans the split dimension between the other two subdivisions (704). The range of the third subdivision equals the solution range discussed bellowed in Section II-B-3. In this example, the third subdivision has an x translation range of –5 to 5 (a range of 10 pixels which equals the character component pixel range) in order to overlap the split that occurs at the x value of 0. By overlapping the spilt between the first and second subdivisions, the third subdivision ensures evaluation of any possible solution occurring close to the edge of these subdivisions.

If the current transformation space is based on a previously stored subdivision, the subdivision previously determined to have the higher match quality score is designated for further subdivision. As discussed above, the y translation and the scale range will remain constant for this subdivision of the translations base (i.e., y translation from –200 to 200 and a scale from 0.85 to 1.15). These three subdivisions (SubD1, SubD2 and SubD3) are then evaluated to determine the match quality score based on the number of points matched between the exemplar and the fingerprint (706). The RAST algorithm 700 verifies that the match quality scores for SubD1, SubD2 and SubD3 satisfy the minimum quality threshold (708). If the match quality score equals or exceeds the minimum quality threshold, the RAST algorithm 700 proceeds and determines if each subdivision could be a solution (710). If a subdivision is a possible solution, it is flagged as such and stored in the queue defined in the memory 204 (714). If more than one of the subdivisions is a possible solution, then only the subdivision with the best match quality score is flagged and stored. In addition, the match quality score of a possible solution subdivision becomes the minimum quality threshold (see 708). The RAST algorithm 700 subsequently proceeds to determine and verify that the maximum number of subdivisions has not been exceeded (see 716).

If one or more of the subdivisions is determined to not represent a possible solution (see 710), then the subdivision (SubD1, SubD2 and/or SubD3) is stored in the queue defined within the memory 204 (712). However, if the match quality score was previously determined to be below the minimum quality threshold (see 708), the RAST algorithm 700 skips storing the current subdivisions (SubD1, SubD2 and/or SubD3) and proceeds to verify that the maximum number of subdivisions has not been exceeded (716). If the maximum number of subdivisions has been exceeded, the RAST algorithm 700 ends control is returned to the algorithm 600 (718). If the RAST algorithm 700 determines that the maximum number of subdivisions has not been exceeded, the stored transformation space with the highest match quality score is retrieved from the memory 204 (720). If the retrieved subdivision was previously flagged as a possible solution, the retrieved subdivision is the final solution of the RAST Algorithm 700 (722) and the process ends. If the subdivision is not a possible solution, then the retrieved subdivision is subdivided again for further processing (see 704). This evaluation process is iteratively repeated for each of the four ranges (x translation, y translation, x scale and y scale) as long as the queue in the memory 204 is not empty and the maximum number of divisions is not exceeded (see 718). The minimum quality score is initially set at 500 for word components, 700 for character components and 500 for text line components. If a previous exemplar resulted in a higher quality score, the higher score replaces the initial minimum score. In one embodiment, a successful match based on word components requires that at least 300 word points be evaluated resulting in a quality score of at least 700 (e.g., at least a 70% match).

2. Match Quality Score

As discussed above, a match quality score is computed or determined each time the transformation space is subdivided by the RAST algorithm 700. The quality score algorithm 800 initializes and identifies the lists of exemplar points (characters, words, or text line components) to be compared to a corresponding list of fingerprint points in the transformation space defined by the RAST algorithm 700 (802). The quality score algorithm 800 then loads the list of current exemplar points to be evaluated (804) and selects the initial exemplar point in the list to determine if a corresponding point exists in the fingerprint list of the parent space of the being subdivided to create the current transformation space (806). If, upon comparing the points within the exemplar list to the points within the fingerprint list (808), a corresponding fingerprint point was not identified within the parent or original transformation space, then the quality score algorithm 800 ends the processing of the current exemplar point because any additional subdivision of the current transformation space will similarly lack a corresponding fingerprint point if one does not exist in the parent or original transformation space (810). Stated another way, a subdivision of a transformation space cannot contain more corresponding fingerprint points than the original transformation space upon which it is based. The quality score algorithm 800, upon determining that a corresponding fingerprint point does not exist, utilizes the current information to compute a quality score that can be evaluated with respect to the of remaining exemplar points and a minimum required quality score (see 822).

However, if an exemplar point is found to correspond to a fingerprint point in the original or parent transformation space, then quality score algorithm 800 defines a new search list based on the identified corresponding point (812). The identified corresponding point, in turn, provides a starting place for the search within the search area of the subdivided transformation space. The quality score algorithm 800 defines the search area by applying the transformation space's translation ranges and scale range to the exemplar point (814). The search area is then scanned by the quality score algorithm 800 in order to identify and evaluate any the fingerprint points located therein (816). If a fingerprint point is identified, the quality score algorithm checks to determine if the point lies within the defined search area (818). If a fingerprint point is not found initially and/or is not within the search area, the quality score algorithm 800 uses the current or last best information to compute and evaluate the quality score (see 822). If the fingerprint point is within the search area, the quality score algorithm 800 determines if the identified point is a potential match (820). For example, if the fingerprint point represents a text line component, the quality score algorithm 800 verifies that the line length stored in the memory 204 is within 20% of the line length of the located point. If the length is within 20%, then the quality score is incremented. If the length is not within the 20% threshold, the quality score remains unchanged.

After each evaluation of an exemplar point, and as previously discussed, the quality score algorithm 800 compares the current quality score and the number of remaining exemplar points with the minimum required score (822). If the computed quality score for the current exemplar point satisfies the minimum required quality score or if there are enough exemplar points remaining to be evaluated that the exemplar could potentially satisfy the minimum quality score (824), then the quality score algorithm 800 continues by evaluating the next exemplar point in the list (see 806). However, if there aren't enough exemplar points remaining to potentially meet the minimum quality score, then the match quality computation ends. For example, if the exemplar point list has two-thousand (2000) character points, then 1400 character points are required to have a corresponding fingerprint point for the transformation space to satisfy the minimum quality score (70%*2000). If a thousand (1000) model points have been evaluated by the loop, but only 399 have had a corresponding fingerprint point (i.e. current quality score is 399) then it will be impossible to reach the minimum score since only 1000 points remain to be evaluated.

In operation, the quality score algorithm 800 defines the search area based on the stored exemplar point and the translation ranges and scale. For example, consider a search area established or defined utilizing the translation ranges (and not the scale range). In this example, the transformation space may include an exemplar point at 850, 1100, an x translation range of −50 to 20, and a y translation range of 120 to 140 (recall that the scale range equals 1.0). These ranges, in turn, define a rectangle search area where x ranges from 800 to 870, and y ranges from 1220 to 1240. If a fingerprint point is located at 810, 1230, then the exemplar point has a corresponding fingerprint point and the transformation space's score is incremented by one (1). As the exemplar points change, the overall size of the search area stays constant at 70 pixels by 20 pixels even as its location changes.

Figures 9A, 9B:
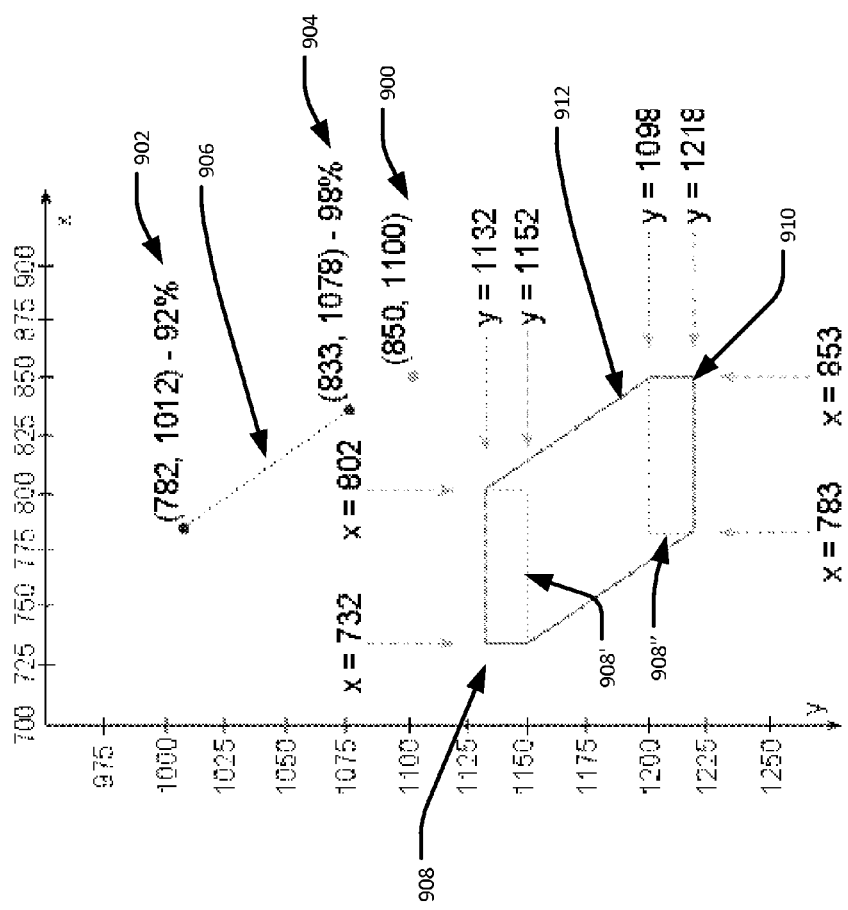
FIGS. 9A and 9B are images depicting the illustrated steps or processes shown in FIG. 8.

Expanding upon this example to include the scale range results in a distortion or stretching of the search area by the quality score algorithm 800. For instance (and as illustrated in FIG. 9A), if the scale range varies from 0.92 to 0.98, then the exemplar point 850, 1100 (900) at the minimum scale (0.92) corresponds to a location of 782, 1012 (902) and at the maximum scale (0.98) corresponds to the location of 833, 1078 (904). As shown in FIG. 9A, a line 906 draw from the minimum point 900 to the maximum point 904 represents an infinite number points from an infinite number of values defined along the scale range. Including the x, y translations ranges discussed above creates a rectangle 908 at the minimum (908') and maximum (908") and an infinite number of rectangles extending there between. As shown in FIG. 9A, this results in the rectangle 906 being "dragged" along the path from the minimum to the maximum scale, which creates the irregular hexagon that, in turn, defines the search area 910.

It should be noted that as quality score algorithm 800 evaluates each exemplar point contained in the transformation space, the length of the irregular hexagon's horizontal and vertical lines remain the same because they are defined by the translation ranges (see FIG. 9B). Moreover, the length of the irregular hexagon's diagonal lines increases as the exemplar points become farther from the origin. These characteristics are explicitly illustrated in FIG. 9A, where the x coordinate of the exemplar point is 850 and ranges between 782 to 833. However, the range would be about 74 to 78 if the x coordinate of the exemplar point were 80, i.e., the length between points decreases closer to the origin. Further, the length and slope of the hexagon's diagonal lines 912 are the same as the length and slope of the line 906 that extends between the exemplar point's minimum scale location 904 and the maximum scale location 906.

The search area defined by the irregular hexagon is computed by the quality score algorithm 800 for each exemplar point often resulting in thousands of computations for character points. To reduce these computational requirements, the quality score algorithm 800 can utilize a rectangular approximation as illustrated in FIG. 9B. This approximation initially increases the possibility that one or more fingerprint points may be located due to the additional area resulting from the increase in search area. However, as the scale range decreases (and the length of the diagonal lines decreases) the approximation search area approaches the irregular hexagon search area. Thus, as the scale range approaches the minimum value the additional search area becomes insignificant.

3. Solution Transformation Space

Figure 8:
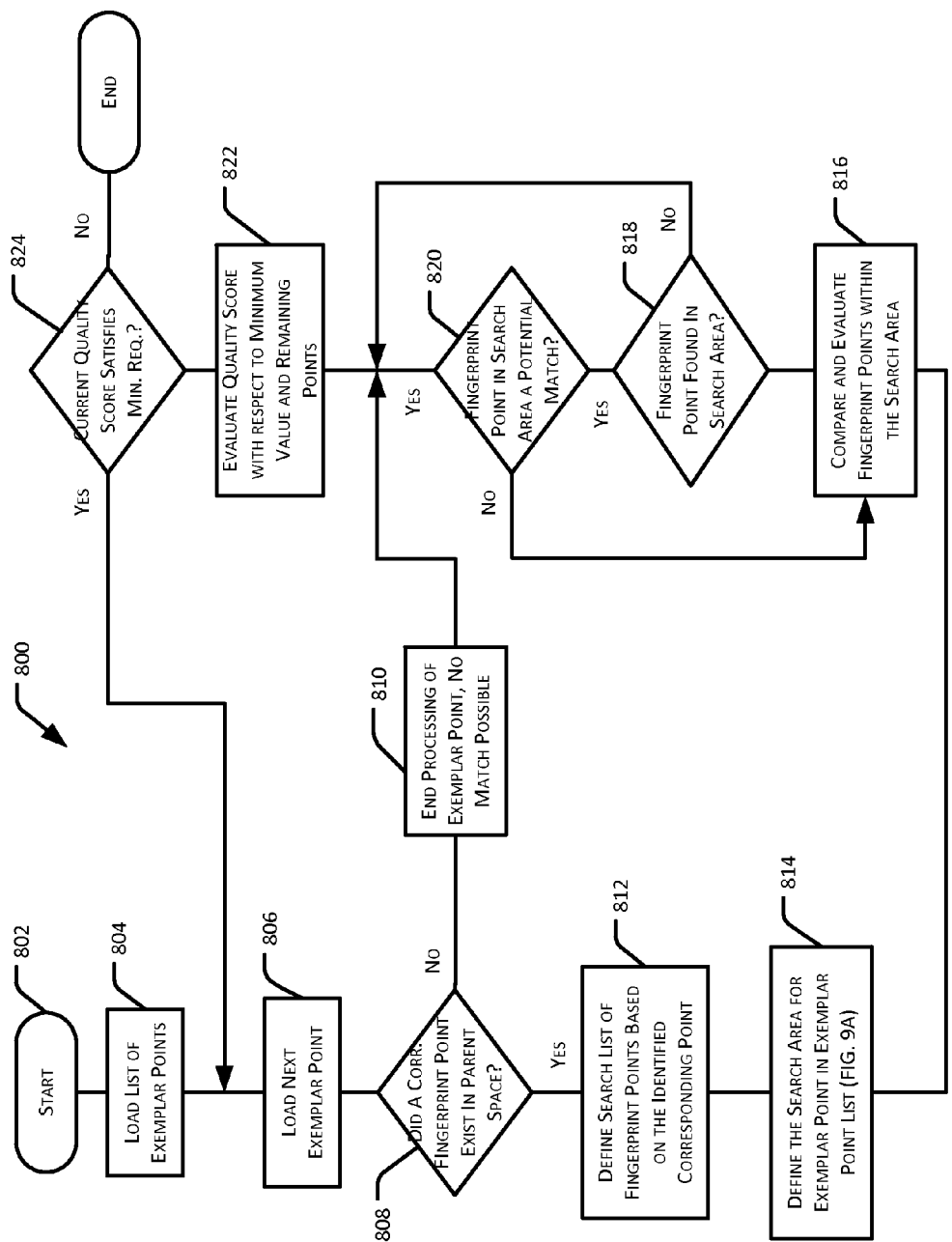
FIG. 8 is a flowchart illustrating the steps or processes implemented to initiate a match quality score computation and generation algorithm.

Returning to FIG. 8, the quality score algorithm 800 loops (returns to 806) until a match or solution is determined such that the range of the transformation space around exemplar point is sufficiently small, includes the corresponding fingerprint point and satisfies the minimum match quality score requirement (824). The scale range may, in one embodiment, be considered sufficiently small when it has decreased to less than or equal to 0.0025. The length of the x, y translation ranges limited to a maximum length for each translation range. For example, the maximum length for the x, y translation ranges may be 45 pixels for text line components, 25 pixels for word components and 10 pixels for character components. These lengths may be selected to reflect and offset the distances between the different component types based on the component size.

Figure 6:
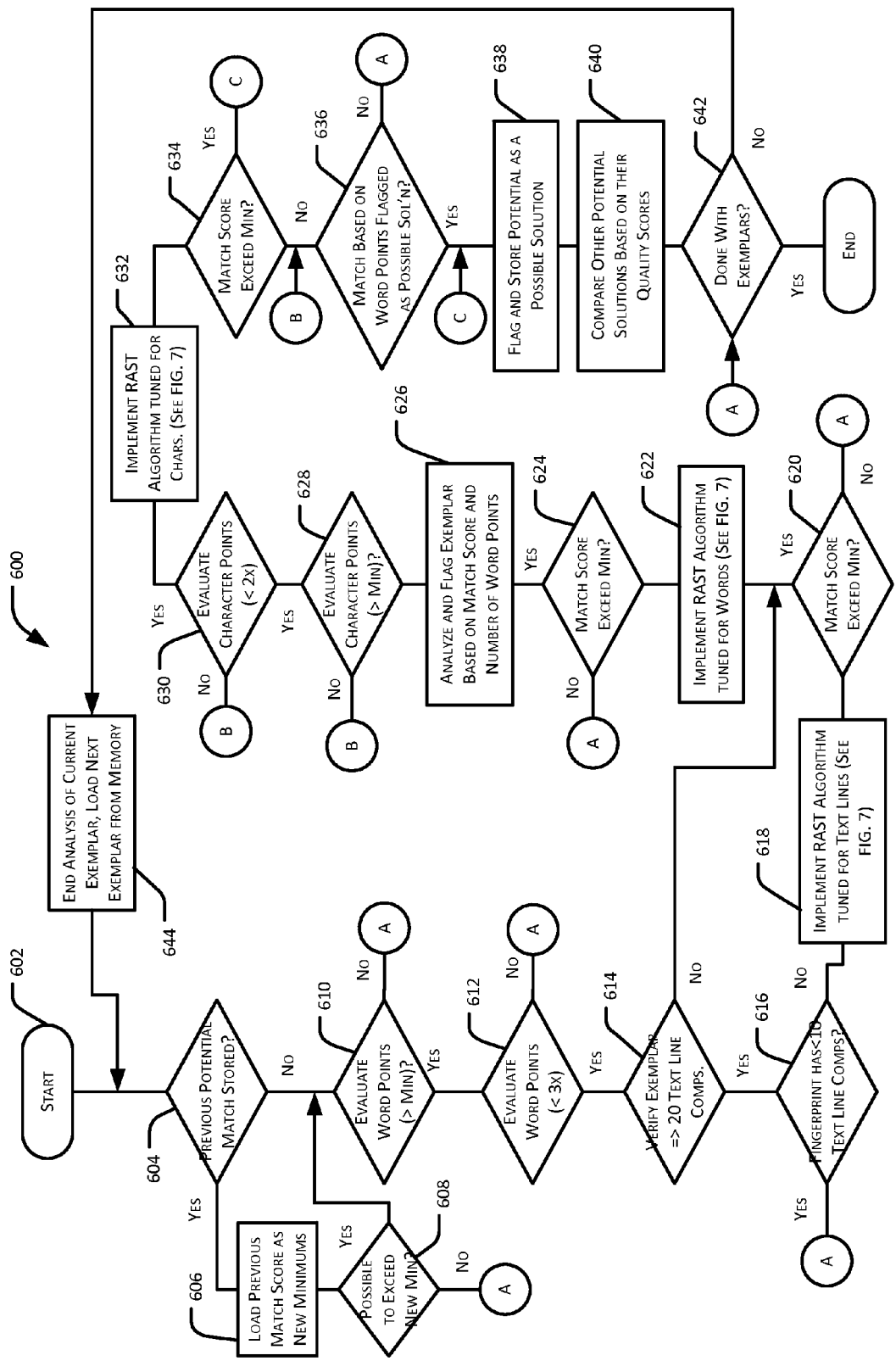
FIG. 6 is a flowchart illustrating the steps or processes implemented to initiate a fingerprint-exemplar matching process or algorithm.

Returning to the fingerprint-exemplar matching algorithm 600 shown in FIG. 6, the algorithm 600 loops through the number of text line components determined to exist within the fingerprint to ensure that they exceed the minimum match quality score (e.g., a match quality score of 500) discussed in the previous operations (620). If the minimum match quality score is not equaled or exceeded after the analysis of the text line components, then the evaluation and matching process ends the evaluation of the current exemplar and loads a new exemplar, if one is available and/or remaining, from the memory 204 (proceed to 642). If the minimum match quality score for text line components is reached, the fingerprint-exemplar matching algorithm 600 continues and evaluates word components in the manner discussed above (622).

Upon completion of the RAST algorithm 700 tuned for words, the evaluation process determines if the match quality score exceeds the minimum threshold (e.g., a match quality score of 500) necessary to continue the evaluation of the current exemplar (624). If the determined match quality score or the number of word components does not satisfy the threshold values, then the current exemplar may be rejected and a new exemplar may be loaded from the memory 204

(proceed to 642). If the match quality score satisfies the minimum threshold for word components and the match quality score exceeds 700 based on at least 300 word components, this word match will be utilized as a potential match even if the subsequent character component analysis fails (626).

The algorithm 600 begins analyzing the character components by verifying that the fingerprint contains enough character components to potentially achieve or exceed the minimum match quality score (e.g., a match quality score of 700 or a score equal to the minimum set at step 606) with respect to the current exemplar (628). If the fingerprint cannot mathematically achieve this minimum threshold, the analysis is stopped and the current exemplar is evaluated utilizing the match quality score determined based on the analysis of the word components (proceed to 636). Subsequently, the algorithm 600 determines if the fingerprint contains less than twice as many character components as those available in the exemplar (630). If the fingerprint is found to contain less than twice the number of word components, then the current exemplar is evaluated utilizing the match quality score determined based on the analysis of the word components (proceed to 636). Fingerprints that contain enough character points to potentially be a match with the current exemplar are analyzed using an implementation of the RAST algorithm 700 tuned for characters (632).

Upon completion of the RAST algorithm 700 tuned for characters, the evaluation process determines if the match quality score exceeds the minimum threshold (e.g., a match quality score of 500) necessary to continue the evaluation of the current exemplar (634). If the determined match quality score or the number of character components satisfies the threshold values, then the current exemplar may be flagged and stored as a possible solution (proceed to 638). However, if the determined match quality score does not satisfy the threshold values, the algorithm 600 determines if a previously flagged and stored quality score (see 626) based on word components exists (636). If an acceptable match quality score doesn't exist for either word components or the character components, the current exemplar may be rejected and a new exemplar may be loaded from the memory 204 (proceed to 642).

If either an acceptable match quality score based on the analysis of the character components or a previously stored match quality score based on word components exists, then this the highest of these scores is flagged and stored in the memory 204 as a possible solution (638). This possible solution is, in turn, compared to any previously stored match solution (640) and the stored solution with the highest match quality score becomes the current best match quality score. If all of the exemplars stored in the memory 204 have been evaluated against the fingerprint, then the process ends (642). However, if additional exemplars have yet to be evaluated, the algorithm 600 loops and loads the next exemplar to be evaluated from the memory 204 (644). The algorithm 600 repeats the above-described process until each of the stored exemplars has been evaluated or until another defined trigger or event causes the process to end. For example, identification of a potential match (see 638) may, in some embodiments, cause the algorithm 600 to stop, even though other exemplars may remain to be evaluated. If each of the stored exemplars has been evaluated and a match has not been identified, then the algorithm 600 may flag or otherwise set aside the unmatched fingerprint (and the corresponding candidate image and/or document). The flagged fingerprint may, in turn be presented to a user or operator for further processing and/or identification. For example, the user may manually match the flagged fingerprint to one of the stored exemplars. Alternatively, the user may determine that the fingerprint represents a document that should not be flagged such as, for example, a handwritten note or letter. In yet another embodiment, the flagged fingerprint could be stored as a new exemplar once it has been identified as a candidate or document of interest. Identifying the candidate or document as being "of interest" may be a manual process performed by a user, or it may be an automated process that, for example, identifies regular features or elements within candidate or document that may indicate a form or other regular document structure and/or layout.

In other embodiments, the exemplars may be grouped and stored based on their relative similarity to each other. In this instance, if a potential match is identified within one group, then the remaining exemplars within that group may be compared to the fingerprint to attempt to identify a better match. Once identified, the best match or the group of exemplars having a quality score within a range that designates them as a "best match" can be automatically identified. If multiple exemplars are identified, the user may be prompted to make the final identification.

4. Refinement of Transformation Values

If and when the transformation space becomes sufficiently small to be a solution, then a tuning process may be implemented to fine-tune the translations and scale. First, the list of exemplar points that had a corresponding fingerprint point for this transformation space is evaluated to remove any model points that corresponded to the same fingerprint point; the fingerprint point is also removed. This results in filtered lists of exemplar and fingerprint points arranged such that each exemplar point corresponds to a fingerprint point.

The average point of both filtered lists may then be determined independently for each filtered list by summing the x coordinates and the y coordinates and then dividing each sum by the number of points. Next, for both filtered lists, the average x distance from the average point and the average y distance from the list's average point is determines such that the average x distance is computed by summing the absolute values of the differences between each x coordinate and the list's average point's x coordinate. The average y distance is found similarly. The x scale is the average x distance of the filtered fingerprint points divided by the average x distance of the filtered model points. The y scale is found in the same manner.

The average exemplar point's coordinates are then multiplied by the x scale and y scale to produce the scaled average exemplar point. The difference between the average fingerprint point x coordinate and the scaled average exemplar point x coordinate is the x translation. Similarly, the difference between the y coordinates is the y translation. Now, the rotation, x translation, y translation, x scale, and y scale are known that map points from the exemplar to the original candidate image. The values of the transformation can be used to map coordinates, such as field maps, from the model to the page image.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be substantially minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

I claim:

1. A method of candidate identification utilizing fingerprint identification, the method comprising:
   receiving a candidate comprising a plurality of pixels arranged on a background;
   identifying at least two subsets of the plurality of pixels where each pixel in a subset is within a threshold distance of at least one other pixel in the subset and wherein each pixel within one subset is not within the threshold distance of any pixel of any other of the at least two subsets;
   determining one representative pixel for each of the identified at least two subsets;
   building a candidate fingerprint of the candidate based on the determined representative pixels and not on the remaining pixels of each of the at least two subsets;
   comparing the candidate fingerprint to a plurality of exemplar fingerprints, each corresponding to one of a plurality of exemplars and determining the best match there between; and
   identifying the candidate based on the exemplar corresponding to the exemplar fingerprint which best matches the candidate fingerprint.

2. The method of claim 1, wherein the plurality of pixels are arranged on the background to form a plurality of constituent content elements of a content pattern and further wherein the constituent content elements of the content pattern include elements selected from the group consisting of: character components; word components and text line components.

3. The method of claim 2, further comprising compensating for rotation variation identified in the content pattern of the received candidate by applying a Hough transformation to the plurality of constituent elements.

4. The method of claim 1, wherein the candidate comprises an electronic document image.

5. The method of claim 4, wherein the candidate further comprises a content pattern comprising at least one of handwritten information, imaging skew, or image noise.

6. The method of claim 4 further comprising:
   determining more than one of the plurality of exemplar fingerprints which best match the candidate fingerprint.

7. The method of claim 1 further comprising:
   designating the candidate as an unknown if it does not correspond to one of a plurality of exemplars.

8. The method of claim 1, wherein each of the at least two subsets comprises a bounded area comprising the subset of the plurality of pixels thereof, and wherein each of the pixels within one of the bounded areas represents a pixel within the threshold distance of another of the remaining pixels within that bounded area.

9. The method of claim 1, wherein the fingerprint comprises at least one list of coordinates corresponding to the determined representative pixels.

10. The method of claim 9, wherein the at least one list includes a first list corresponding to characters represented by the at least two subsets of the plurality of pixels represented by each of the determined representative pixels; a second list corresponding to words represented by the at least two subsets of the plurality of pixels represented by each of the determined representative pixels and a third list corresponding to text lines represented by the at least two subsets of the plurality of pixels represented by each of the determined representative pixels.

11. The method of claim 1 wherein the threshold distance comprises a vertical threshold distance and a horizontal threshold distance.

12. The method of claim 11 wherein at least one of the vertical threshold distance or horizontal threshold distance may be iteratively varied.

13. The method of claim 1 wherein the threshold distance defines an amount of white space between pixels to separately group into subsets the pixels representative of at least one of a character, a word or a text line.

14. The method of claim 1 wherein, for each of the identified at least two subsets, the determined representative pixel thereof is one of the subset.

15. The method of claim 1 wherein each of the plurality of exemplar fingerprints is associated with a context, the method further comprising ascribing the context associated with the exemplar which best matches the candidate fingerprint to the candidate fingerprint.

16. The method of claim 1 wherein the identifying further comprises ignoring a subset of the plurality of pixels when the number of pixels therein is below a first threshold, when the vertical width of the pixels therein as arranged on the candidate is less than a second threshold, or the horizontal width of the pixels therein as arranged on the candidate is less than a third threshold, or a combination thereof.

17. The method of claim 1 wherein the arrangement of the plurality pixels of the candidate comprises private sensitive information, the candidate fingerprint being free thereof such that the candidate fingerprint may be communicated over a non-secure network.

18. A system for candidate identification utilizing a fingerprint, the system comprising:
a processor coupled with a memory having computer readable instructions stored therein and operable to cause the processor to:
receive a candidate comprising a plurality of pixels arranged on a background;
identify at least two subsets of the plurality of pixels where each pixel in a subset is within a threshold distance of at least one other pixel in the subset and wherein each pixel within one subset is not within the threshold distance of any pixel of any other of the at least two subsets;
determine one representative pixel for each of the identified at least two subsets;
build a candidate fingerprint of the candidate based on the determined representative pixels and not on the remaining pixels of each of the at least two subsets;
compare the candidate fingerprint to a plurality of exemplar fingerprints, each corresponding to one of a plurality of exemplars and determining the best match there between; and
identify the candidate based on the exemplar corresponding to the exemplar fingerprint which best matches the candidate fingerprint.

19. The system of claim 18, wherein the plurality of pixels are arranged on the background to form a plurality of constituent content elements of a content pattern and further wherein the constituent content elements of the content pattern include elements selected from the group consisting of: character components; word components and text line components.

20. The system of claim 19, wherein the computer readable instructions are further operable to cause the processor to compensate for rotation variation identified in the content pattern of the received candidate by applying a Hough transformation to the plurality of constituent elements.

21. The system of claim 18, wherein the candidate comprises an electronic document image.

22. The system of claim 21, wherein the candidate further comprises a content pattern comprising at least one of handwritten information, imaging skew, or image noise.

23. The system of claim 21, wherein the computer readable instructions are further operable to cause the processor to determine more than one of the plurality of exemplar fingerprints which best match the candidate fingerprint.

24. The system of claim 18, further wherein the computer readable instructions are further operable to cause the processor to designate the candidate as an unknown if it does not correspond to one of a plurality of exemplars.

25. The system of claim 18, wherein each of the at least two subsets comprises a bounded area comprising the subset of the plurality of pixels thereof, and wherein each of the pixels within one of the bounded areas represents a pixel within the threshold distance of another of the remaining pixels within that bounded area.

26. The system of claim 18, wherein the fingerprint comprises at least one list of coordinates corresponding to the determined representative pixels.

27. The system of claim 26, wherein the at least one list includes a first list corresponding to characters represented by the at least two subsets of the plurality of pixels represented by each of the determined representative pixels; a second list corresponding to words represented by the at least two subsets of the plurality of pixels represented by each of the determined representative pixels and a third list corresponding to text lines represented by the at least two subsets of the plurality of pixels represented by each of the determined representative pixels.

28. The system of claim 18, wherein the threshold distance comprises a vertical threshold distance and a horizontal threshold distance.

29. The system of claim 28, wherein at least one of the vertical threshold distance or horizontal threshold distance may be iteratively varied.

30. The system of claim 18, wherein the threshold distance defines an amount of white space between pixels to separately group into subsets the pixels representative of at least one of a character, a word or a text line.

31. The system of claim 18, wherein, for each of the identified at least two subsets, the determined representative pixel thereof is one of the subset.

32. The system of claim 18, wherein each of the plurality of exemplar fingerprints is associated with a context, the method further comprising ascribing the context associated with the exemplar fingerprint which best matches the candidate fingerprint to the candidate fingerprint.

33. The system of claim 18, wherein the computer readable instructions are further operable to cause the processor to ignore a subset of the plurality of pixels when the number of pixels therein is below a first threshold, when the vertical width of the pixels therein as arranged on the candidate is less than a second threshold, or the horizontal width of the pixels therein as arranged on the candidate is less than a third threshold, or a combination thereof.

34. The system of claim 18, wherein the arrangement of the plurality pixels of the candidate comprises private sensitive information, the candidate fingerprint being free thereof such that the candidate fingerprint may be communicated over a non-secure network.

35. A method of candidate identification utilizing fingerprint identification, the method comprising:
receiving a candidate comprising a plurality of pixels arranged on a background;
identifying at least two subsets of the plurality of pixels where each pixel in a subset is within a threshold distance of at least one other pixel in the subset and wherein each pixel within one subset is not within the threshold distance of any pixel of any other of the at least two subsets;
determining one representative pixel for each of the identified at least two subsets;
building a candidate fingerprint of the candidate based on the determined representative pixels and not on the remaining pixels of each of the at least two subsets;
communicating the candidate fingerprint over a network;
receiving the candidate fingerprint;
comparing the candidate fingerprint to a plurality of exemplar fingerprints, each corresponding to one of a plurality of exemplars and determining the best match there between, wherein each of the plurality of exemplar fingerprints is associated with a context based on the corresponding exemplar;
identifying the candidate based on the exemplar corresponding to the exemplar fingerprint which best matches the candidate fingerprint; and ascribing the context associated with the exemplar fingerprint, which best matches the candidate fingerprint, to the candidate fingerprint.

* * * * *